United States Patent
Lin et al.

(10) Patent No.: US 8,365,084 B1
(45) Date of Patent: Jan. 29, 2013

(54) METHOD AND APPARATUS FOR ARRANGING THE DISPLAY OF SETS OF INFORMATION WHILE PRESERVING CONTEXT

(75) Inventors: Andrew Lin, San Francisco, CA (US); Mike Sundermeyer, Palo Alto, CA (US); Michael Gough, Middletown, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1121 days.

(21) Appl. No.: 11/445,409

(22) Filed: May 31, 2006

Related U.S. Application Data

(60) Provisional application No. 60/686,119, filed on May 31, 2005, provisional application No. 60/687,518, filed on Jun. 2, 2005.

(51) Int. Cl.
*G06F 3/00* (2006.01)

(52) U.S. Cl. ........ 715/769; 715/728; 715/770; 715/768; 715/797; 715/794

(58) Field of Classification Search ................... 571/728, 571/769, 770, 768, 79, 794, 796, 797
See application file for complete search history.

(56) References Cited

U.S. PATENT DOCUMENTS

| | | | | |
|---|---|---|---|---|
| 5,687,331 A * | 11/1997 | Volk et al. | ...................... | 715/840 |
| 6,253,218 B1 * | 6/2001 | Aoki et al. | ...................... | 715/201 |
| 2003/0076359 A1 * | 4/2003 | Martinez et al. | .............. | 345/770 |
| 2004/0261037 A1 * | 12/2004 | Ording et al. | ................. | 715/788 |
| 2006/0107231 A1 * | 5/2006 | Matthews et al. | ............. | 715/788 |
| 2008/0214214 A1 * | 9/2008 | Reissmueller et al. | ........ | 455/466 |

OTHER PUBLICATIONS

Glaser, Richard, "Mac OS X Basics, Short Course", revised 3.26.01 mm, http:www.macos.utah.edu/Documentation/MacOSXBasics/Interface.html, printed May 11, 2006, published by the Internet, 15 pages.

* cited by examiner

*Primary Examiner* — William Bashore
*Assistant Examiner* — Mylinh Tran
(74) *Attorney, Agent, or Firm* — Fish & Richardson P.C.

(57) ABSTRACT

A system and method allows panels to be dragged into position using an icon displayed on a selector user interface or from another position, and as the panels are moved over a position in which another panel is displayed, the other panel, and panels in subsequent positions, are animated to move out of the position over which the panel being dragged is positioned.

15 Claims, 9 Drawing Sheets

METHOD AND APPARATUS FOR ARRANGING THE DISPLAY OF SETS OF INFORMATION WHILE PRESERVING CONTEXT

CROSS-REFERENCE TO RELATED APPLICATIONS

This application claims the benefit of the priority of U.S. Provisional Application Ser. No. 60/686,119, filed May 31, 2005, entitled "METHOD AND APPARATUS FOR ARRANGING THE DISPLAY OF SETS OF INFORMATION WHILE PRESERVING CONTEXT," and this application claims the benefit of the priority of U.S. Provisional Application Ser. No. 60/687,518, filed Jun. 2, 2005, entitled "SYSTEM AND METHOD FOR ARRANGING THE DISPLAY OF SETS OF INFORMATION WHILE PRESERVING CONTEXT." The disclosures of the above applications are incorporated herein by reference in their entirety.

BACKGROUND

The present disclosure is related to computer software and more specifically to user interface computer software.

To display different sets of information, some computer software displays the different sets of information in different panels on the display screen, with one panel per set of information. However, there may be more panels of information available than some users may wish to display, and users may wish to customize the order in which the panels are displayed in order to suit each user's needs. It can therefore be desirable to allow users to select which sets of information will be displayed in panels, and to allow the users to rearrange the order of the panels.

One user interface that could be used to allow users to select which information is displayed and the order in which it is displayed in panels would be to present a list of titles of the information and a text box into which the user could enter a number. The user would only enter numbers in the text box corresponding to titles corresponding to information the user wanted to see displayed in panels. The number would correspond to the order in which the panels were displayed. When the user clicked an "accept" or "OK" button, the information would be displayed according to the numbers in the user interface. If five panels were displayed, they would be numbered 1-5 on the user interface. If the user entered a "3" into an additional text box, and left the others where they were, panels 3-5 would be renumbered 4-6 and panels 1-6 would be instantly displayed in the order specified.

Although the above user interface could be used to select and position panels displaying sets of information from a larger number of sets of information, it suffers from various drawbacks. The first is, because the panels change in response to an "accept" or "OK" button, the panels suffer from a lack of continuity of display. The panels abruptly change positions when the user clicks the button, and so the user is required to take some time to reorient where the various sets of information have been redisplayed on the display screen. Additionally, such a user interface does not allow the user to visualize what the result will look like before the user completes making a selection. Furthermore, the use of the user interface control may not be intuitive; the user may be required to read instructions to use the control.

SUMMARY

A system and method allows a user to drag a set of information, such as a panel, into position on a display screen. The set of information may be dragged from another position, or it may be dragged from a selector user interface containing a list of sets of information available for display and an icon that is used to initiate the dragging of a corresponding panel to the display. As the user drags the set of information, the set of information can be displayed in a semi-transparent fashion above the other information on the display, allowing the user to view information underneath the panel being dragged. If the set of information is dragged over or hovered over another set of information, the other set of information can be moved out of the way in an animated fashion to allow the user to follow its movement. The set of information animates to a subsequent position on the display screen, along with any other sets of information that were displayed in the positions following the position to which the dragged set of information was dragged or hovered, allowing the user to follow the movement so as to help the user orient to the new positions. The user can then release the set of information or move it elsewhere. If the set of information is released, the sets of information animated are assigned the new positions, and if the user drags the set of information elsewhere, the sets of information are returned to their previous positions and the operation repeats. A user can also drag a set of information back to the selector user interface, thereby removing the full set of information from being displayed.

Particular embodiments of the various aspects of the subject matter described in this specification can be implemented to realize one or more of the following advantages. A system and method can allow a user to select a number of sets of information from a larger number of available sets of information to be displayed as panels on a display screen, to rearrange the order of the panels in an intuitive fashion that provides continuity between the former display and the new display when panels are selected or rearranged, and allows the user to visualize the appearance of the new display before the user completes making a selection or rearrangement.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
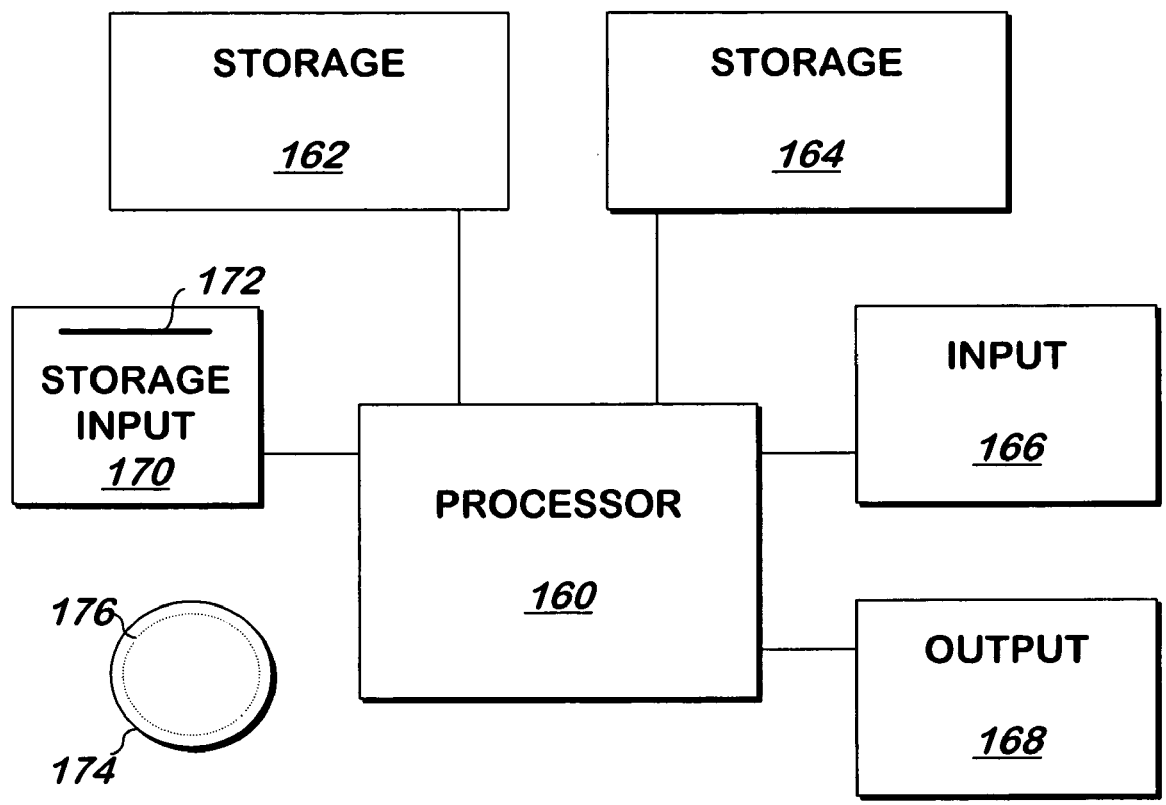
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166, such as a computer keyboard or mouse or both, allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to conFIG. the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Santa Clara, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond, Wash., or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif., or INTERNET EXPLORER browser commercially available from MICROSOFT above, although other systems may be used.

Figure 2A:
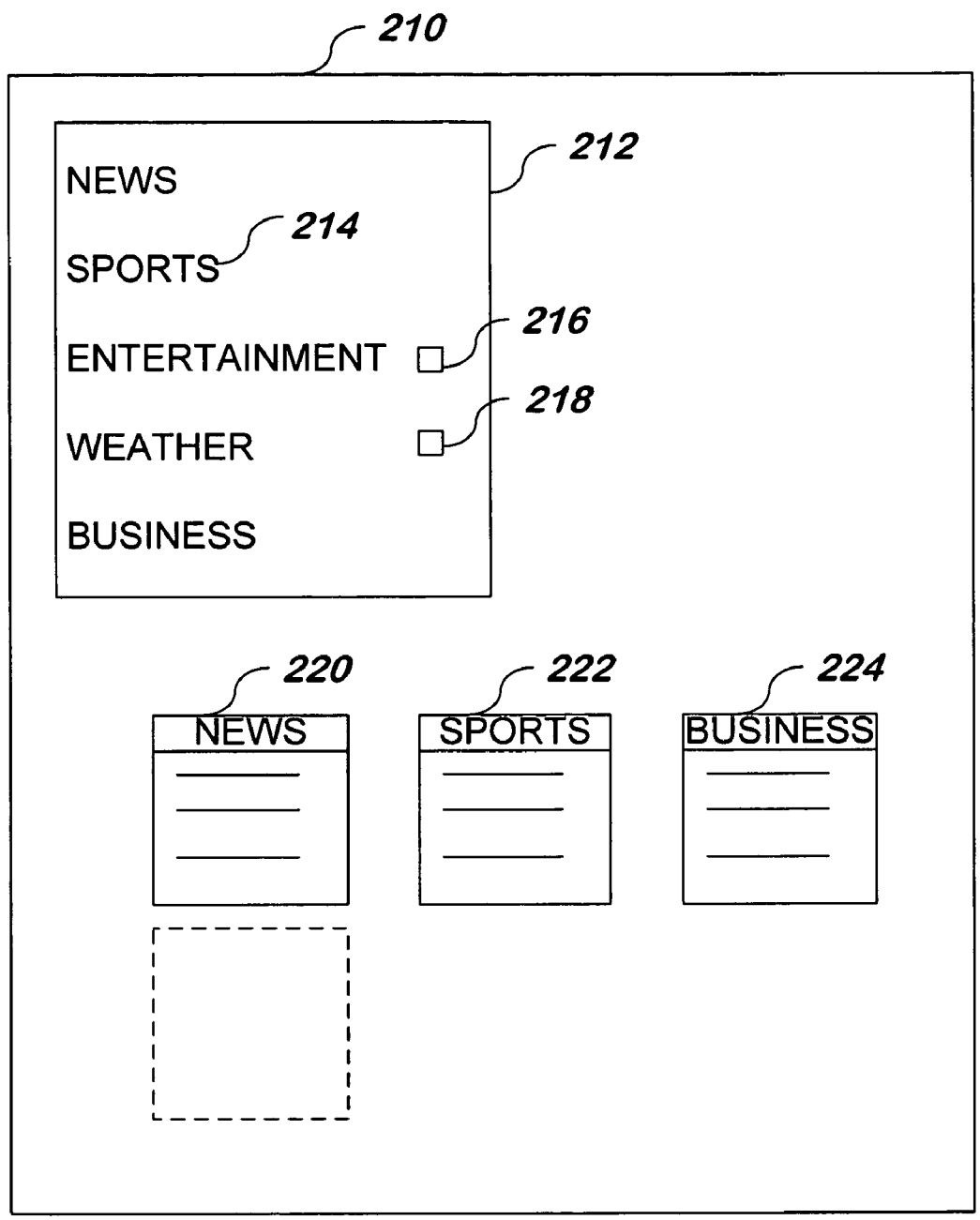
FIGS. 2A-2E are illustrations of the changes of display of panels and/or icons in a window according to some embodiments of the present invention.

Referring now to FIG. 2, consisting of FIGS. 2A-E, representative screen displays at various times in response to various user actions are shown. FIG. 2A illustrates a starting view of a window 210 on a screen, for example, as may be shown when an application starts up. A window 210 is described herein, however, the elements described in a window may be displayed in multiple windows or no windows on a display screen. A selector user interface control 212 is displayed, having titles of sets of information controlled by selector user interface 212, such as title 214, and icons 216, 218 corresponding to sets of information not currently displayed as panels. The titles corresponding to sets of information displayed in panels 220-224 are displayed without icons. In one embodiment, the icons 216, 218 appear to be miniature representations of the panels 220-224, although other icons may be used.

Panels 220-224 display sets of information. The sets of information displayed may be different sets, different views of the same sets, or any combination of these. As shown in this example, there are three sets of information displayed, titled, "news", "sports" and "business", but any types of information may be displayed by the present invention. The contents of the sets of information are represented by the three horizontal lines in each panel 220-224, and could be data, headlines or other information. Each set of information is displayed in panels 220-224, which may have the same or similar general appearance, although the content may be different. Although three panels 220-224 and one selector 212 are displayed, there may be any number of these items. Each panel 220-224 is assigned to a position on the window 210, though other positions are available for use, such as the one shown in outline form in FIG. 2A. More than one such other position may be available.

When a user uses a mouse or other pointing device to click on, and drag an icon 216-218, the icon 216-218 disappears from its location and is replaced by a blank panel, that can be dragged by the user using the mouse. In one embodiment, the blank panel animates from the icon, making the icon appear to expand into the blank panel. In one embodiment, the blank panel is similar in size and shape of panels 220-224, but in one embodiment, the content and title of the panel is not displayed at this point, although it is in other embodiments. The blank panel is white and semi-transparent in one embodiment, appearing to float above the remainder of the elements 212-224 and any other objects in the window. Because the panel is semi-transparent, the other elements 212-224 beneath it are visible, at least to a degree, if the user drags the blank panel over them.

Figure 2B:
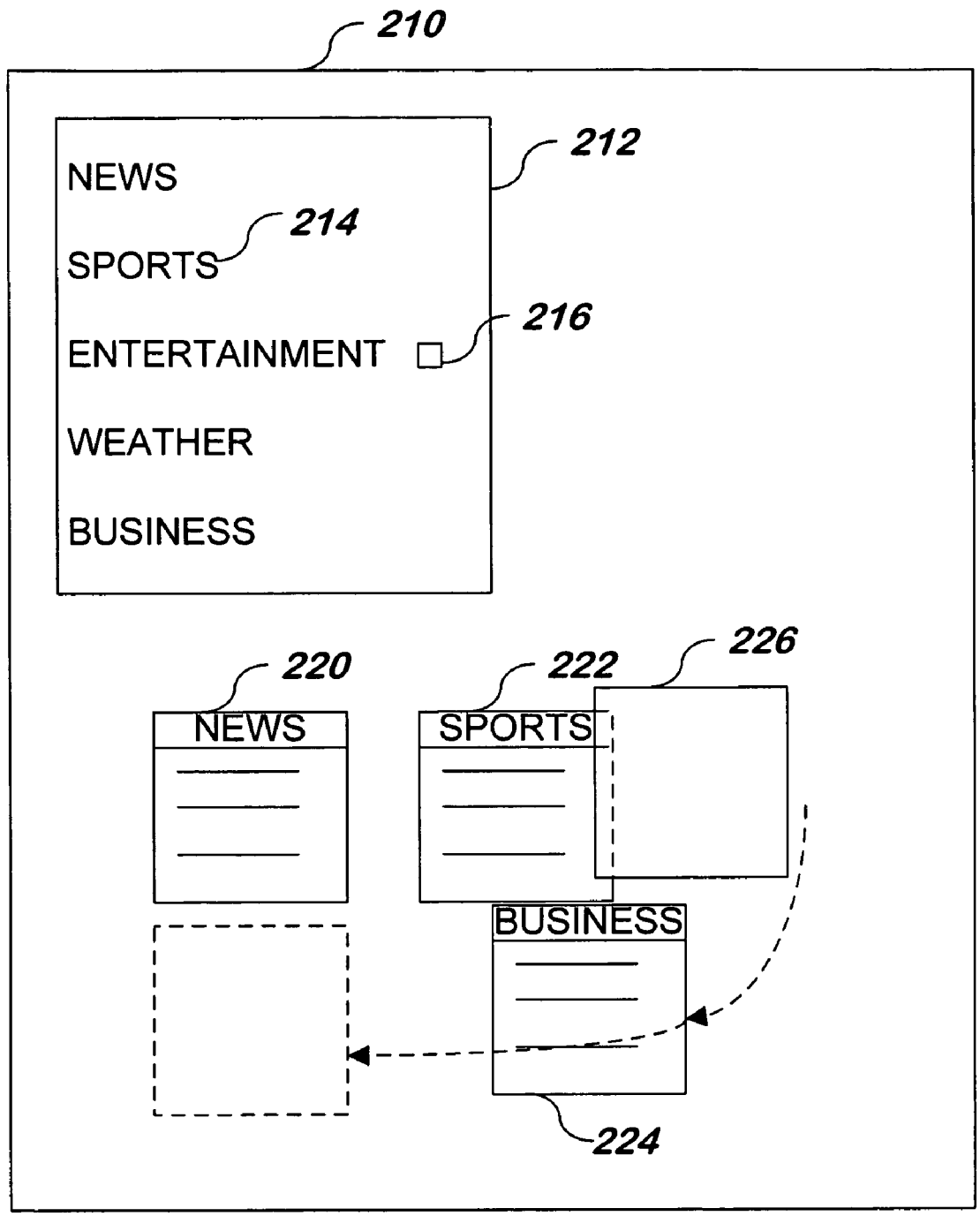

FIG. 2B illustrates icon 218 of FIG. 2A being dragged into the third panel position, formerly occupied by panel 224. Referring now to FIG. 2B, the icon (218 of FIG. 2A) has been converted to a blank semi-transparent panel 226, though in one embodiment, the title, "weather" may be added to the panel at this point to allow the user to identify what panel is being moved. Panel 226 follows the mouse cursor as the user drags it, in a familiar manner, being displayed with the same position relative to the mouse cursor as the user drags the mouse cursor around the screen. However, when a user moves panel 226 over or near, but offset to the left of another panel (or in one embodiment, allows panel 226 to hover over or near, but offset to the left of another panel), the other panel 224 animates moving to the next panel position, and any panels that were in the panel positions past that of such other panel, animate moving one panel position to the next panel positions, until an unoccupied panel position is reached or there are no more panels, so that the user can see the panel positions moving. In one embodiment, the animation for each such panel occurs simultaneously, although in another embodiment, the animation occurs one panel at a time to show a ripple effect. As shown by the dashed arrows, panel 224 is in the process of moving from the third panel position at which it was formerly displayed (as shown in FIG. 2A) to the fourth panel position.

Panel 226 is actually over two panel positions, the second one occupied by panel 222 and the third one formerly occupied by panel 224. In one embodiment, as between any two or more panels, the first panel in the order of panel positions that is moved (in this case panel 224) is the panel having its vertical center line to the right of (or to the right of by at least a threshold number of pixels) the vertical center line of the panel 226 being dragged or hovering. In one embodiment, the center vertical line or another vertical line of the panel being dragged must be over the panel position corresponding to the panel that will be moved, or be within a threshold number of pixels of the panel position. Thus, in one embodiment, a panel that is dragged or hovers directly over (or almost over) another occupied panel position will not cause the panel in that position to move.

In one embodiment, if the blank panel 226 is over more than one row of panels, the first panel moved will be the panel in the row in which a majority of the panel being dragged is positioned, although other rules for resolving the row of the panel that will have the first position moved may be used. In one embodiment, if a majority of the panel being dragged 226 is not in any row, (a row being defined by the upper edge and lower edge of the panel or panels in that row), no panels will be moved.

Figure 2C:
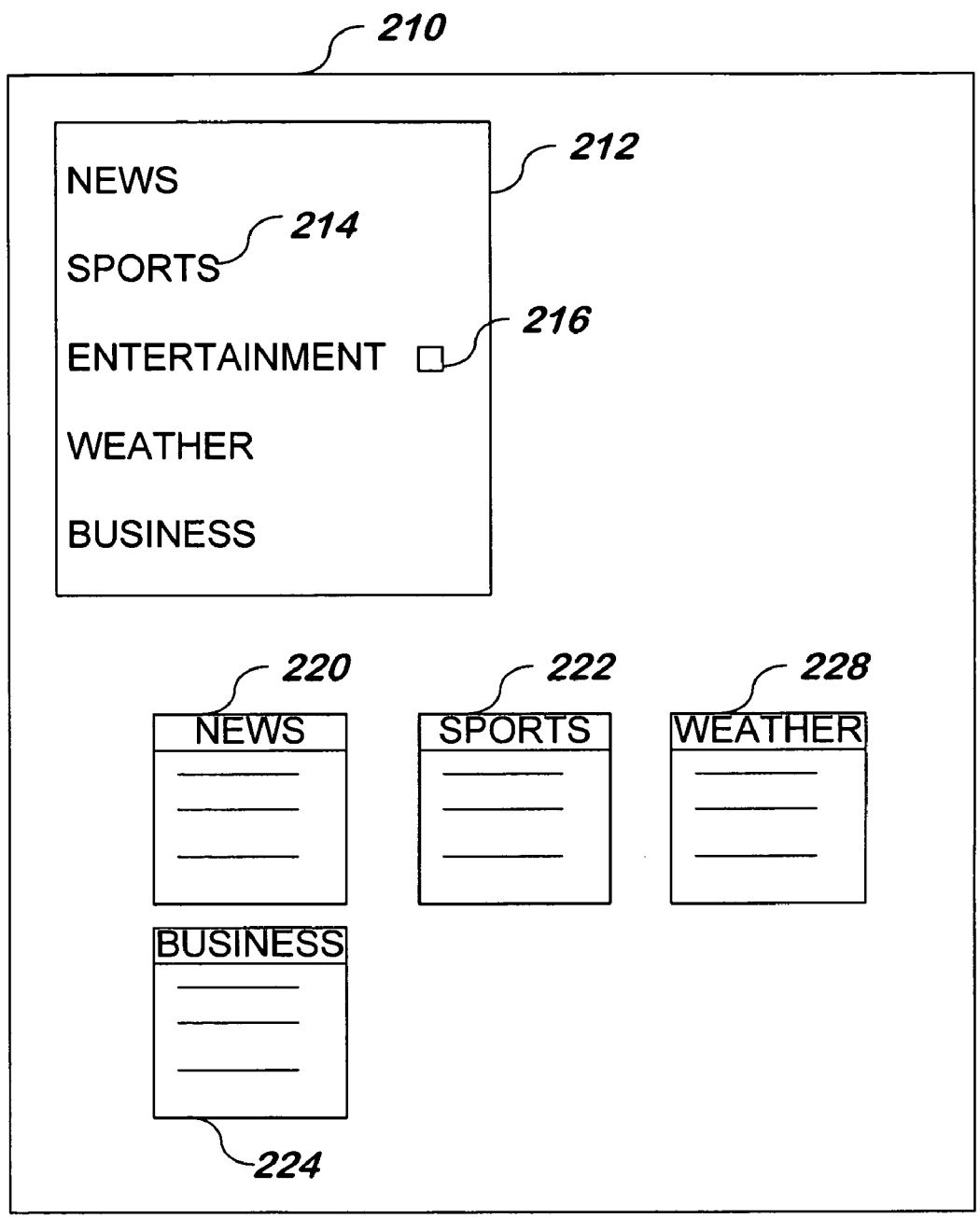

FIG. 2C illustrates the window 210 after the user releases the mouse button used to drag the blank panel 226 of FIG. 2B when the center line of the blank panel is to the left of the third panel position in the first row, but to the right of the second panel position in that row, and when a majority of the blank panel is in the second row. Referring now to FIG. 2C, when the user releases the mouse when dragging a blank panel, the blank panel is converted to a panel 228 showing the set of information to which the icon, described above, corresponds, or the view of a set of information to which the icon corresponds, and moved in an animated fashion from the location at which it was released to the third panel position. Thus, in FIG. 2C, the blank panel has been not only assigned to, and displayed in, the third panel position (with positions 1-3 being in the top row, left to right, and panel positions 4-6 being in the second row of panels, left to right), but the panel 228 is displayed with a weather title and weather set of information in the body of the panel below the title.

The user may drag a panel into different positions, and in that case, when a user drags a panel over (but offset to one side of) another position or hovers a dragged panel over (but offset to one side of) another position, the system and method rearranges the other panels in an animated fashion before the user releases the panel being dragged to not only show the ultimate positions the panels will take if the user releases the mouse button, but before the user releases the mouse button that the user uses to drag the panels, but also to allow the user to see how the panels are being rearranged so that the user does not need to reorient himself or herself, or to identify where the panels are located, or can at least do so more quickly.

Figure 2D:
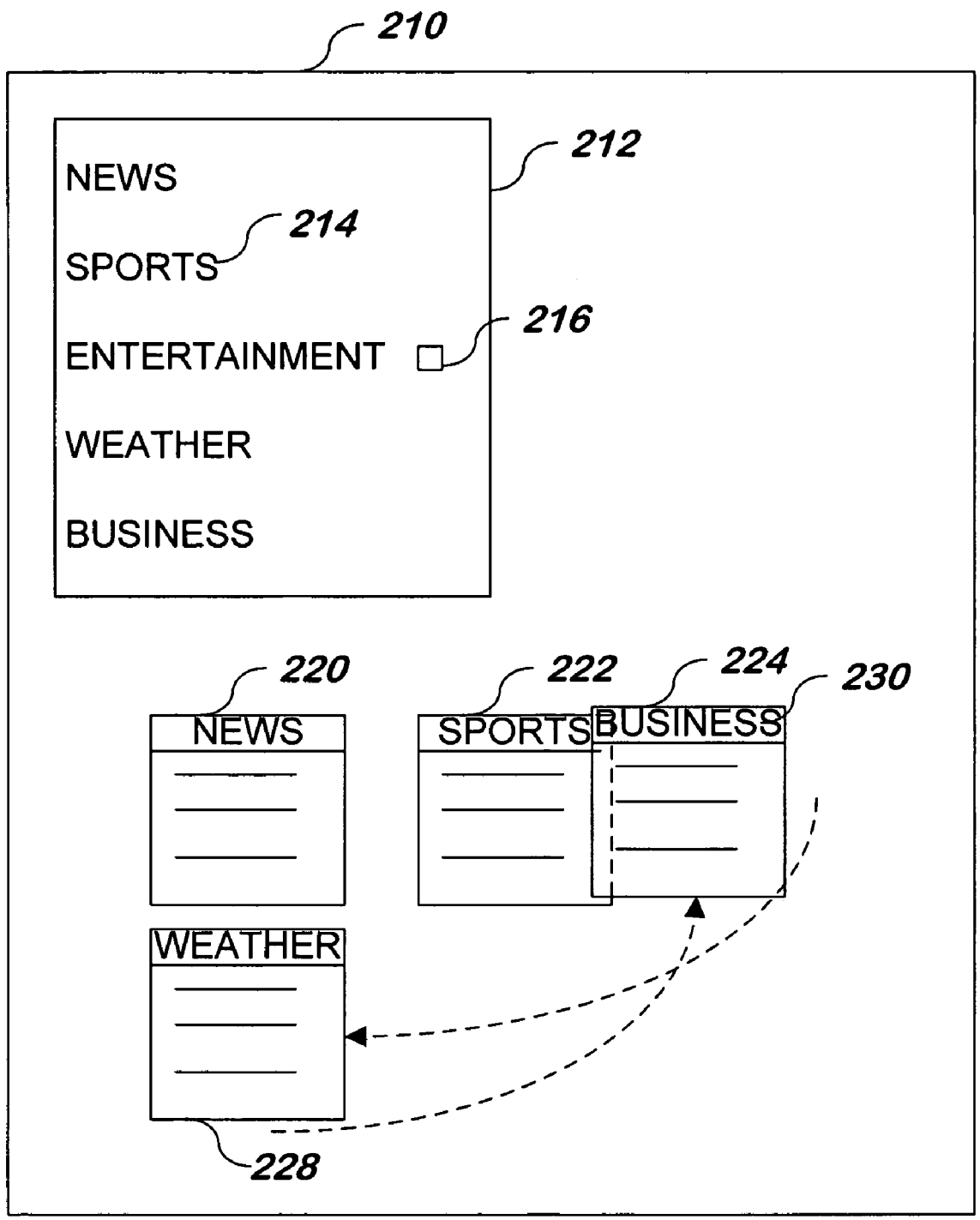

Referring now to FIG. 2D, the window 210 of FIG. 2C is shown as the user has clicked on panel 224 and dragged it into the third panel position formerly occupied by panel 228. To drag a panel, in one embodiment, a user holds a mouse button down when the mouse cursor is over a portion of the panel. In one embodiment, the portion is the title bar 230, though other embodiments may employ other portions or may use the entire panel to allow the user to drag a panel. The panel 224 dragged is displayed as the topmost object of the other objects of the window 210, but in a semi-transparent fashion, so that the other objects 212-222, 228 in the window 210 are visible under the panel. In this case, the right portion of panel 222 is visible under the left portion of panel 224 as indicated by the dashed line. As the user drags panel 224 using the mouse in a conventional fashion in the direction indicated by the dashed arrow terminating underneath panel 224, panel 228 is displayed as moving to the fourth panel position in an animated fashion, for example in the direction of the arrow terminating at the right edge of panel 228. Thus, the user can see both panels move in a manner that allows the user to follow the panels, not just the panel being dragged.

Figure 2E:
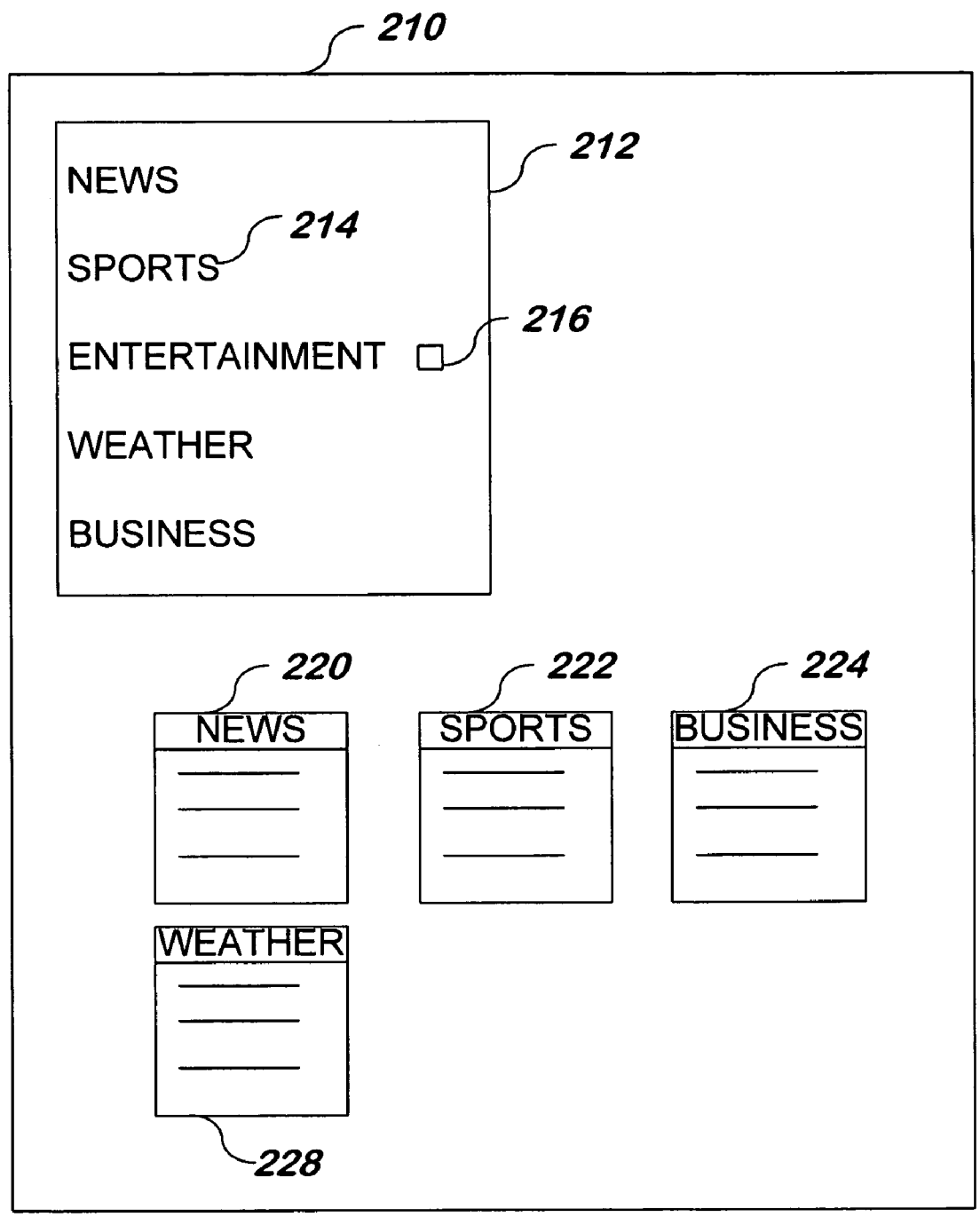

Here, when the user releases the mouse button, panel 224 will be displayed in the third panel position and panel 228 will be displayed in the fourth panel position. In this case, the panels exchanged positions as shown in FIG. 2E. If, however, a panel in the fifth position was dragged nearby, and to the left of the third position, the panels that had occupied the third and fourth positions would be animated into the fourth and fifth positions, respectively, and if the user released the mouse button when the panel being dragged had a position nearby and to the left of the third position, the panels so animated would be assigned the positions into which they were animated and the panel dragged would be assigned the third position and animated into that position.

The animation of a panel may be performed by displaying it briefly at various positions along its trajectory until it reaches the position to which it is temporarily assigned pending the user releasing the mouse button. When the user releases the mouse button, the panel is assigned its temporary position, and the dragged panel is assigned the nearby position. If the user drags the panel into a different position before releasing the mouse button, the panels animate back to their former positions, to the extent there is time to do so before the panel being dragged reaches or hovers over a different panel position.

In the event that a user uses the mouse or other pointing device to drag a panel out of a position, any other panel in the next position and all panels in subsequent positions are animated into the previous position to collapse the hole left by the panel dragged out. In one embodiment, if a panel position between the panel dragged and last displayed panel is unoccupied, the only panels moved are those between the panel dragged out of position and the first unoccupied panel position following the position from which the panel was dragged.

With the above behavior of a user interface elements in mind, the method of the present is now described. Although the panels and selector user interface elements of FIGS. 2A-2E are one type of user interface elements that can be implemented using the method of the present invention, the method of the present invention may be used with any type of user interface elements.

Figure 3A:
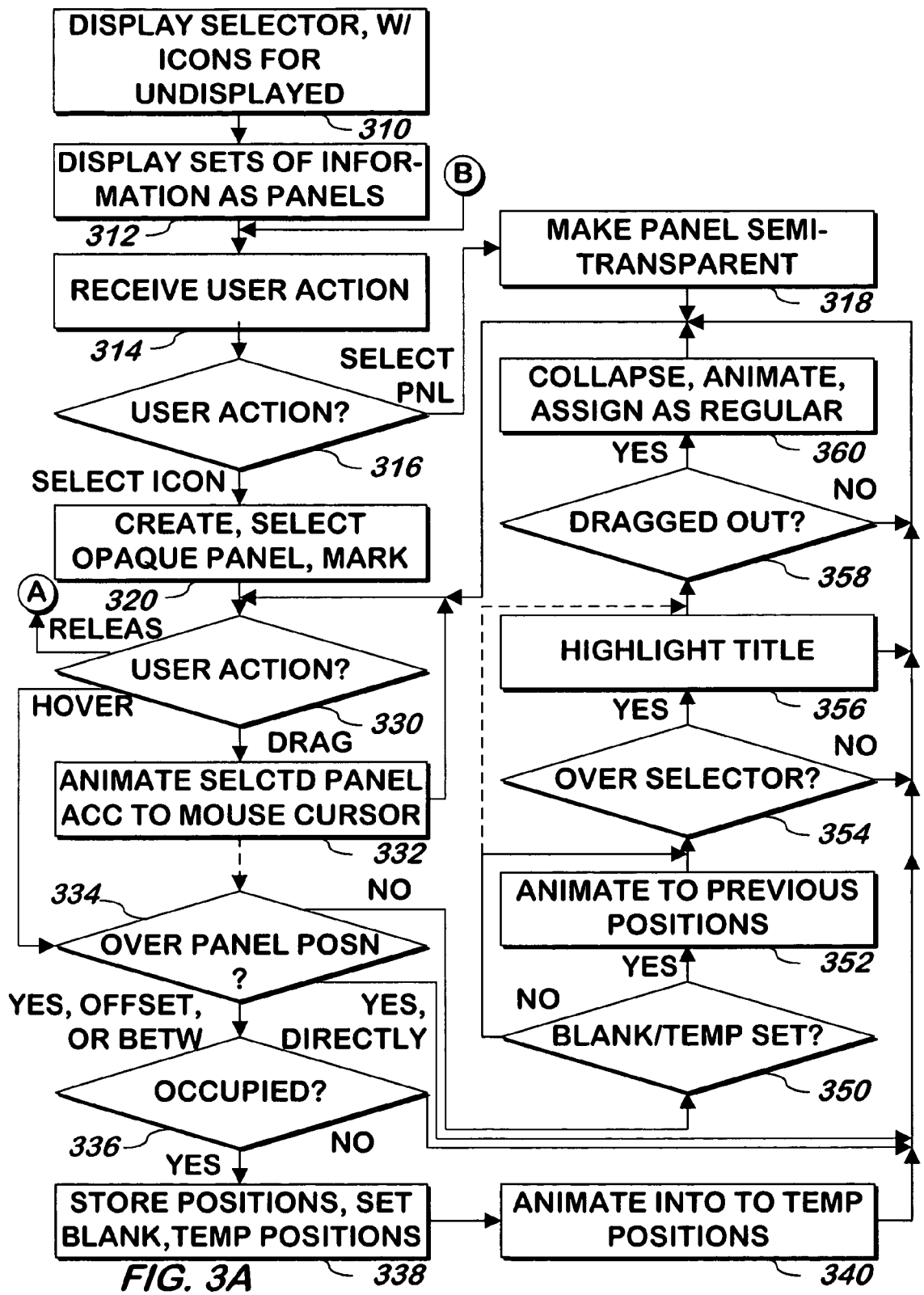
FIG. 3, consisting of FIGS. 3A and 3B, is a flowchart illustrating a method of allowing a user to select and arrange panels of information according to some embodiments of the present invention.
Figure 3B:
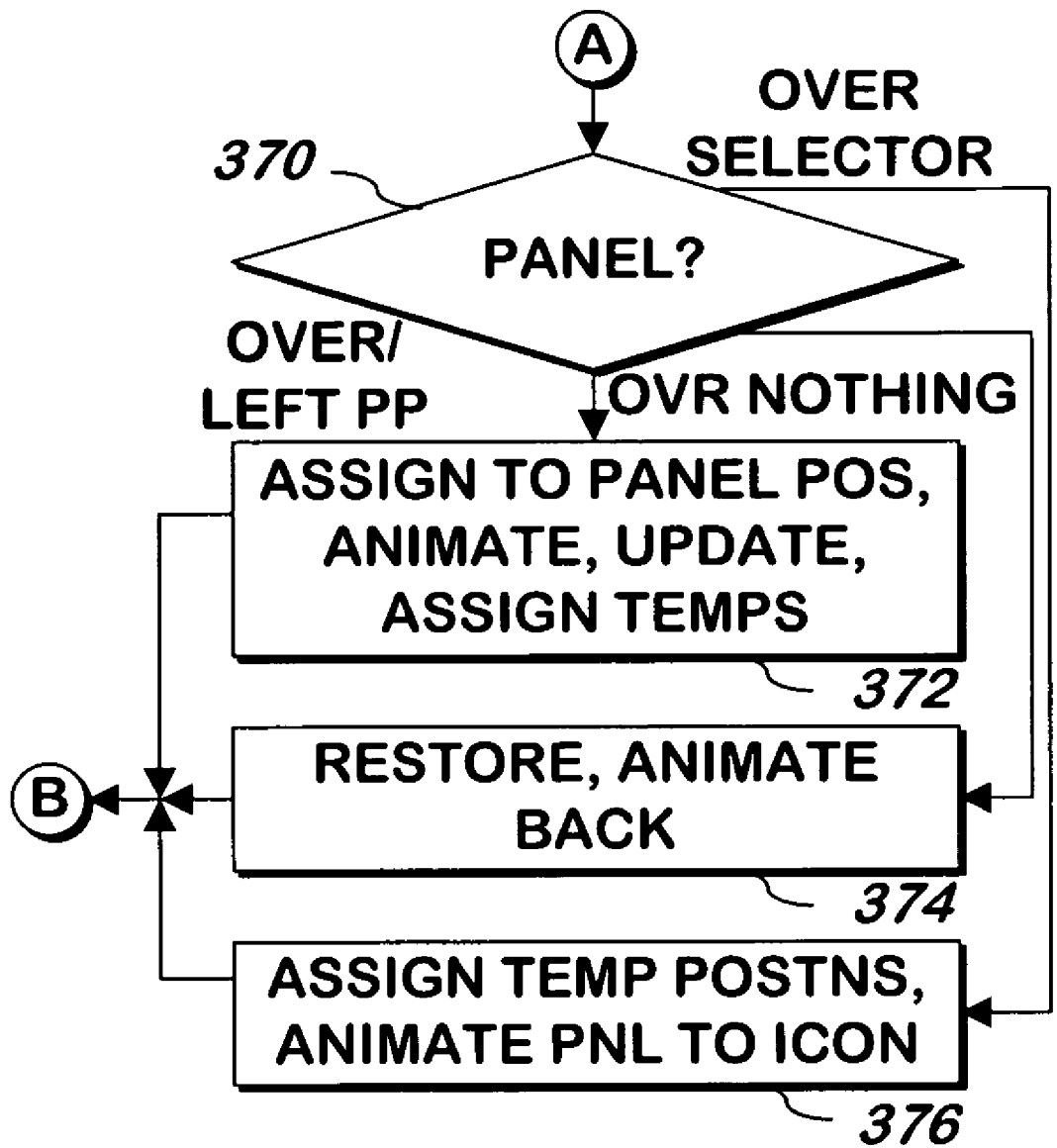

Referring now to FIG. 3, consisting of FIGS. 3A and 3B, a method of responding to user actions with respect to user interface elements is shown according to one embodiment of the present invention. A selector user interface is displayed at 310 with titles or other identifiers of the sets of information for various sets of information displayed and undisplayed and with icons or other indicators for sets of information or views of sets of information that are not displayed on the window or screen, such as via independently moveable panels or other windows. Sets of information are displayed at 312, for example, as panels or other windows, and such sets of information correspond to those titles on the selector user interface control that do not have icons displayed, or are otherwise differentiated from those titles corresponding to sets of information or views of sets of information not displayed on the window or screen.

A user action may be received at 314. If, at 316, the user action is the mouse or other pointing device selection of an icon from the selector user interface control displayed at 310, a semi-transparent panel is created, marked as a blank panel, and displayed at 320, at a position that corresponds to (e.g., tracks) the mouse cursor as long as the user holds down the mouse button used for dragging. In one embodiment, a selection is made by clicking on and dragging the icon more than a few (e.g., 3) pixels in any direction, although in another embodiment, a selection is made by merely clicking on the icon. The panel may animate from the icon at the time it is created, making the panel appear to be an expansion of the icon. Display of the selected icon on the selector user interface can also be ceased at 320.

If the user selects (e.g., clicks on or slightly drags) a displayed panel at 316, the panel is rendered and displayed semi-transparently as above the other objects in the window at 318 and the method continues at 330 using that panel.

If the user drags (or further drags) the mouse at 330, the position of the panel will be redisplayed at 332 at a location corresponding to the mouse cursor, which may change from a non-dragged version to indicate that a dragging operation is in effect. If the panel being dragged is dragged directly over a panel position at 334 as described above, the method continues at 330 in one embodiment: because the desire of the user as to whether to place the panel being dragged before or after the panel over which the panel being dragged was dragged is ambiguous.

If the panel being dragged is over, but offset from, a panel position (e.g., a majority of the panel dragged is in the row containing the position and the center vertical line of the panel dragged is to the left of the center vertical line of the panel position or a vertical line elsewhere, such as ⅓ of the way from the right edge of the panel position, and the vertical center line of the panel dragged is at least partially over the panel position), or the center vertical line is between panel positions at 334, if the panel position over which the panel being dragged, or the panel position to the right of the vertical center line of the panel being dragged, is not occupied by another panel at 336, the method continues at 330. If such panel position is occupied by another panel at 336, the prior positions of the panels that will be reassigned to different positions as described above, are stored, and the new positions of the existing panels are assigned as temporary positions at 338, as described above, the panels are animated at 340 into their temporary positions as described above, and the method continues at 330.

In one embodiment, instead of 334 following 332, 330 follows 332 and 334 only follows 330 when the user hovers the mouse cursor (e.g., holds it down without moving it for a threshold period of time or without moving it significantly for the threshold period).

If the user hovers or drags the panel over a location that does not correspond to a panel position at 334, if temporary positions had been assigned as described above at 350, the panels assigned temporary positions are animated from the temporary positions to their regular positions, the positions they had before such assignment and the temporary positions are removed at 352. In one embodiment, if temporary positions are not assigned at 350, the method continues at 354 or 358. At 354, if the user hovers or drags the panel over the selector user interface, the title corresponding to the dragged panel is highlighted on the selector user interface at 356 and the method continues at 358 or 330.

At 358, if the panel is initially dragged from a location corresponding to the position at which the panel is regularly assigned (e.g., the panel is dragged so that it is no longer mostly in the row to which its regularly assigned panel position corresponds, or it remains in the row but is dragged to the right of its position or to the right of its position by more than a few pixels, or it remains in that row but the center vertical line of the panel being dragged is to the left of the vertical center line of the panel position to the left of the panel position to which the panel being dragged is assigned), the panels assigned to positions following the position assigned to the panel being dragged may be "collapsed" at 360 by assigning them into regular positions one less than the positions to which they were assigned and such panels are animated into those positions at 352 and the method continues at 330 and in another embodiment, panels are not collapsed: 330 follows the "no" branch of 350 or 356. A panel is dragged out of its regularly assigned position when the panel is dragged from a location either directly over the position or from a position in which the majority of the panel is in the row corresponding to the position, and the vertical center line of the panel being dragged is over or to the left of (or in one embodiment, a few pixels to the right of), the vertical center line of its regularly assigned panel position, but not to the left of any panel position to the left of that panel position.

If the user releases the mouse button at 330, the method continues at 370 of FIG. 3B. If the panel being dragged is fully or mostly in the row of a position, and has its vertical center line to the left of the vertical center line of the position but not left of the position to the left of that position, and one not assigned to a panel at 370, the panel being dragged is assigned that position as its regular position, any panels temporarily assigned to positions are assigned to those positions as their regular positions, and the panel being dragged is animated into the position it has been assigned and its contents are updated and the panel, including its contents, are displayed opaquely without being displayed on top, the temporary positions that had been assigned are removed at 372 and the method continues at 314. The update may include updating the contents of an existing panel, or, if the panel is a blank panel, building a new panel to correspond to the appearance and controls of the other panels and adding the information to the content area of the panel. A panel is considered assigned to a position to which it is temporarily assigned if a temporary assignment is currently in effect, and otherwise is considered assigned to its regular position.

If the panel being dragged is over the selector user interface control or over a position on the selector user interface control at or near where the icon for such panel would be displayed at 370, any panels assigned temporary positions are assigned those positions as their regular positions and the icon corresponding to the panel being dragged is displayed on the selector user interface control at a location corresponding to the title or other identifier of the panel being dragged at 376 and the method continues at 314. In one embodiment, 376 includes animating the size of the panel being dragged to the size of the icon and simultaneously animating the location of the panel being dragged to the location of the icon so that the panel being dragged appears, in the animation, to become the icon.

If the panel being dragged is released over a location other than a panel position or selector user interface control or portion thereof as described above at 370, the panels are assigned their positions in effect when the panel being dragged was initially dragged, and any panels not displayed at that location are animated back to those locations and redisplayed at 374 and the method continues at 314. The assignment of positions in 374 may be made by first, checking to see if the panel being dragged is assigned to a regular position that is also assigned as the regular position of another panel. This would have occurred when the other panel was collapsed into the panel position of the panel being dragged when the panel was initially dragged out of that position. If so, the panel having the same regular position assigned to the panel being dragged, and all panels that have a regular assignment to subsequent positions, are reassigned one position higher. Any temporary positions are removed from all of the panels after animating the panels from their temporary positions to their regular positions.

Figure 4:
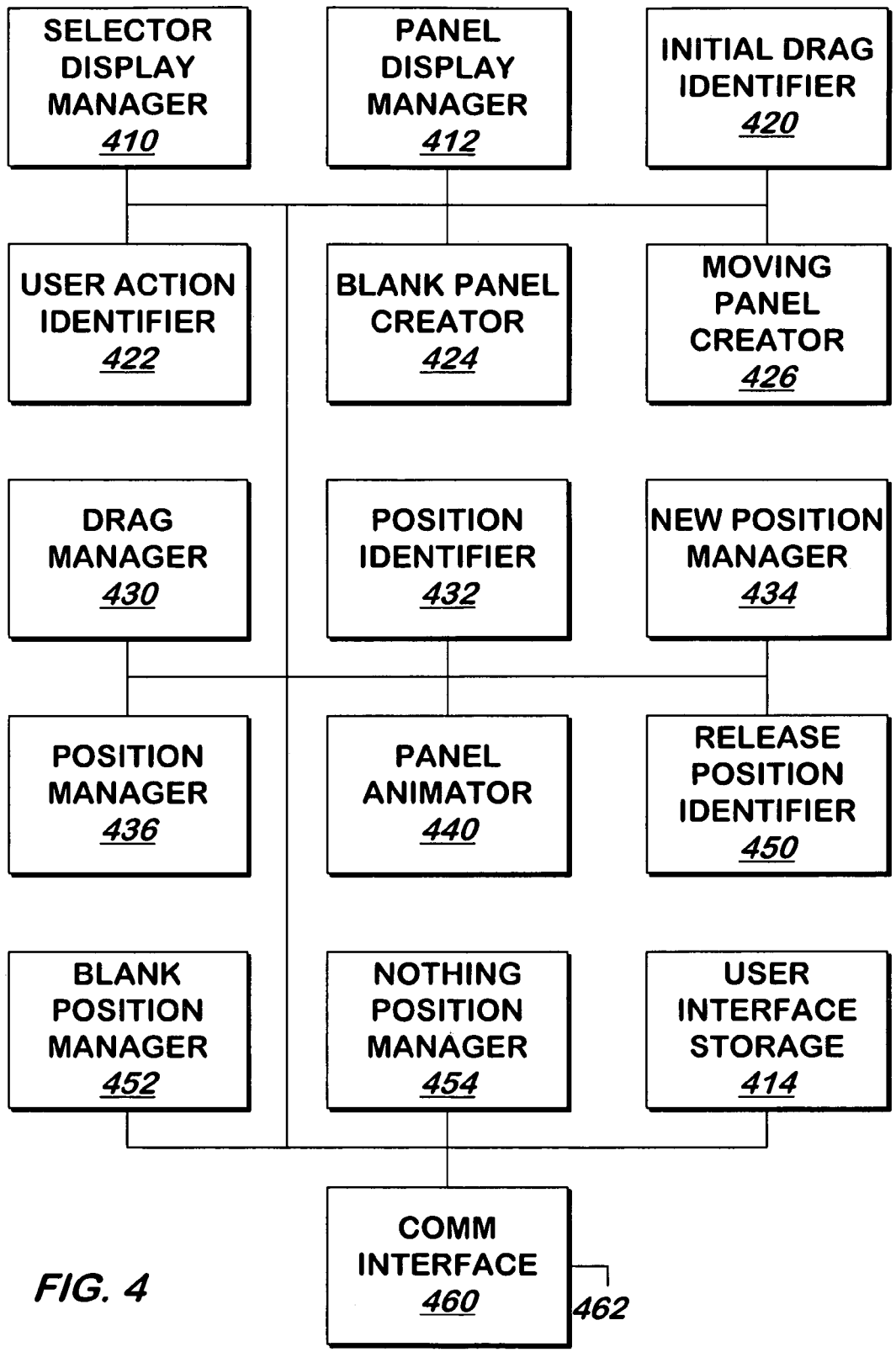
FIG. 4 is a block schematic diagram of a system for allowing a user to select and arrange panels of information according to some embodiments of the present invention.

The operations at 374 may include animating a blank panel back to the selector user interface and then redisplaying the icon corresponding to the blank panel, as the blank panel animates into the icon, making the blank panel appear to turn into the icon. If the panel that had been dragged is not blank, the opacity of the panel can be reset at 374 to an opaque status, so that the panel will no longer be displayed in the semi-transparent fashion it was displayed while it was being dragged. The operations at 374 may also include updating the contents of each of the panels moved or all of the panels. Referring now to FIG. 4, a system for allowing a user to reconfigure information displayed in a window or other area is shown according to some embodiments of the present invention. At system startup, selector display manager 410 displays the selector user interface control, including titles or other descriptive information, and icons corresponding to panels not displayed as described above. Also at system startup, panel display manager 412 displays the panels to be displayed at system startup. In one embodiment, the panels to be displayed at system startup, and the panel positions of each panel, are stored in a file by panel display manager 412 when the user exits the system of FIG. 4, and this file is read by panel display manager 412 at system startup. In one embodiment, the file may be supplied with the system of FIG. 4 with default values, such as those that indicate that no panels are to be displayed, or that a selection of a few panels are to be displayed, as well as the positions in which to display them. For each panel that can be displayed, the file also contains a title of the panel and the name and path, or URL (Uniform Resource Locator), of the file that describes how to display the contents of the panel or contains instructions that can be executed to display the contents of the panel. Panel display manager 412 uses the information from the file to determine which sets of information or which views of sets of information are to be displayed, and then displays such sets of information in the respective panels at the positions indicated in the file. Panel display manager 412 builds in user interface storage 414 a panel data structure for each panel, including its position, its title and the location of the file used to render the contents of the panel. Panel display manager 412 then provides the information from the file to selector display manager 410 which displays the selector user interface control using the information from the file, which also includes the titles of the non-displayed panels.

To display a panel, panel display manager 412 provides graphical information into user interface storage 414 that includes the "skin" of the panel, which includes its shape (e.g., the box and lines that define all panels) and user interface controls common to each panel, and the title of the panel from the file. The graphical information can be used by an operating system or rendering entity to display the graphical representation of the panel skin. In addition, the information in the file describes for each panel, whether displayed or not, how to display the contents and other unique attributes (e.g., the title at the top of the panel) of each specific panel. In one embodiment, as noted above, this description may be the location (e.g., file name and path, or URL) of a file containing instructions that allow panel display manager 412 or the file or another entity to generate or retrieve data and display the contents and other information of the panel. When panel display manager 412 displays the panel skin and title, it also executes the instructions in the file or causes another entity to do so, providing a handle to the area in the panel in which the contents can be displayed if necessary. Panel display manager 412, the file or other entity provides graphical information, including window or screen coordinates, to user interface storage 414 such graphical information capable of being displayed or rendered by an operating system or other rendering entity. Panel display manager 412 then provides the coordinates of the borders of the panel skin to the operating system or rendering entity, which renders the panel skin, title and contents. In one embodiment, the update of a panel, described below, may include updating the panel contents only, and then providing the operating system or rendering entity the borders of the interior of the panel, as the panel skin and title do not normally change their graphical information.

If the user selects (e.g., clicks on, using the mouse or other pointing device or slightly drags) an icon from the selector user interface or a panel using its title bar, initial drag identifier 420 receives an indication that a selection action is being performed and the position of the mouse cursor at which the drag action was initiated, relative to the upper left hand corner of the window containing the selector user interface and the panels. Both selector display manager 410 and panel display manager 412 store in user interface storage the coordinates of the borders of the panels and the selector user interface relative to the upper left hand corner of the window in which the panels and selector user interface elements are displayed, as well as the coordinates of the borders of the icons in the selector user interface and the panel title bars. Initial drag identifier 420 uses this information to identify whether the user is dragging an icon, a panel or another element. If the user has selected another element, initial drag identifier 420 signals an appropriate handler (not shown) for that element with the mouse cursor location. If the user selects an icon (e.g., by clicking on its title bar or by dragging its title bar slightly), initial drag identifier 420 signals blank panel creator 424 with the mouse cursor location received from the operating system. If the user selects a panel, initial drag identifier 420 signals moving panel creator 426 with the mouse cursor location received from the operating system.

When so signaled, blank panel creator 424 creates a blank panel, which in one embodiment is a white, semi-transparent box having the shape and size of a panel when the panel is displayed as described herein. The semi-transparent box may be created by blank panel creator 424 as an object to be rendered in the same window as the selector user interface and any panels and stored in user interface storage 414 by storing graphical information for the panel, including its color (white) and opacity (indicating semi transparent) with an indication that it is to be rendered as if it were in front of the selector user interface and its contents and any other panels displayed and their contents. Blank panel creator 424 creates in user interface storage 414 a data structure for the panel containing a unique identifier of the panel, the title of the panel, information about rendering the panel (e.g., the file name and path or URL) and the location of the panel according to the mouse cursor, for example, causing the location of the center or other portion of the blank panel to be at the location of, or correspond to, the mouse cursor. The data structure also contains a space for the position of the panel, left unused. The operating system or another rendering entity (not shown) may then be signaled by blank panel creator 424 to render the window or portion of the window containing the blank panel.

In one embodiment, for each panel, the panel data structure in user interface storage 414 may have space for a regular panel position, a temporarily assigned panel position, and the location noted above, which is described by the upper left hand corner of the panel relative to the upper left hand corner of the window in which the panel is displayed. Blank panel creator 424 sets the location of the blank panel consistent with the description above (leaving the regular position and temporary position blank), and marks the panel as a blank panel.

Blank panel creator 424 identifies the title of the panel from the location of the mouse cursor used to select the icon and a data structure in user interface storage 414 that is built and maintained by selector display manager 410, such data structure storing the titles, and locations of each displayed icon corresponding to the title, and other information, such as a name and path, or URL, of the file that can provide the contents of the panel as described above, and an indication as to whether the panel corresponding to the title is being displayed. Blank panel creator 424 stores the title and file identifier in the data structure for the panel in user interface storage 414, and provides the title to selector display manager 410, which stores an indication in the data structure it maintains in user interface storage 414 that indicates that the panel corresponding to the title it receives is being displayed. Selector display manager 410 updates the graphical information it maintains in user interface storage 414 corresponding to the selector user interface control to remove the icon corresponding to the title it receives and signals the operating system or rendering entity to update the portion of the display containing the icon or the selector user interface control.

As noted, a user may also select a displayed panel, for example, to move it from one position to another, or to move it to the selector user interface control to cause it to no longer be displayed in a panel position. When signaled as described above, moving panel creator 426 uses the mouse cursor location and the locations of the title bars of the panels to identify the panel the user has selected and stores an identifier of that panel into user interface storage 414. In one embodiment, the graphical information for each panel in user interface storage 414 contains a transparency parameter and an indicator that indicates whether the panel should be rendered as if it were above the selector user interface control and the other panels. Moving panel creator 426 sets the indicator and transparency parameter to a value indicating the panel should be rendered semi-transparently, allowing the panel to be rendered as if it was semi-transparent, so that one can see the panel being moved and its contents as well as any panel or contents or selector user interface control underneath it. Moving panel creator 426 stores in user interface storage 414 an indication that the panel has been selected, and signals the operating system or a rendering entity to render the panels and user interface controls according to the parameters it sets and the operating system or rendering entity so renders the panels and selector user interface control.

In one embodiment, the rendering entity includes the Flash Player plug-in to commercially available browsers, the plug-in being commercially available from Adobe Systems Incorporated, of San Jose, Calif. In such embodiment, mouse cursor positions may be first passed from the operating system to the rendering entity and the rendering entity then passes the cursor position as if it were the operating system as described herein. Although a mouse cursor is described herein, any pointing device may be used.

The user may then either drag the blank or other panel, hover with it, or release it. If any of these activities are performed, the operating system will call user action identifier 422, with an indicator of the action and the coordinates of the mouse cursor. If the action is a drag, user action identifier 422 signals drag manager 430 with the location of the mouse cursor at the beginning and end of the drag during a drag period. If the user keeps dragging through several periods, drag manager 430 will be signaled, and operate as described herein, at the end of each of the drag periods.

When so signaled, drag manager 430 updates in user interface storage 414 the location of the panel dragged by the same amount and relative positions of the mouse cursor at the start and end of the drag period, and then signals the operating system or the rendering entity to rerender the window or portion containing the moved panel; causing either the dragged blank panel or dragged panel to appear to move consistently with the mouse cursor from the start to the end of the drag period. Identification of the panel to move may be made using the identifier of the panel selected that is stored in user interface storage 414 as described above, or may be made using the coordinates of the mouse cursor and the positions assigned to each panel, according to a formula that converts between coordinates and positions and vice versa.

In one embodiment, drag manager 430 signals position identifier 432 with the identifier of the panel. Position identifier 432 identifies whether the user has dragged a blank or other panel over a position occupied by another panel (a panel temporarily assigned to another position is considered to occupy its temporary position, and not considered to have occupied the position it had been assigned to before its temporary assignment, referred to as its "regular position" or "regularly assigned position").

In another embodiment, such determination is only made if the user hovers the panel being dragged, and so if user action identifier 422 determines that the user has hovered the mouse, either because it is so signaled from the operating system or it determines that the location of the mouse cursor has not changed for a threshold period, though the user is still holding the mouse button down, user action identifier 422 provides the mouse coordinates to position identifier 432, which makes the determination described above using the position of the mouse cursor to identify the panel over which the mouse is hovering. In such embodiment, drag manager 430 does not signal position identifier 432.

Position identifier 432 identifies whether the panel being dragged is to the left of a panel position as described above. If the position is not to the left of a panel, if none of the panels have been assigned temporary positions, position identifier 432 may take no action, although in another embodiment, position identifier 432 may change the appearance of either the area corresponding to the position or the panel being dragged to indicate that the panel is over a panel position that is unused at the time. If, however, the position is not to the left of a panel, but other panels have been assigned temporary positions, position identifier 432 so indicates to position manager 436. When it receives such an indication, position manager 436 builds a list of panels assigned temporary positions and provides the list to panel animator 440, with an indication to animate the panels on the list from their temporary positions to their regular positions. Panel animator 440 so animates the panels as described above and signals position manager 436. When so signaled, position manager 436 removes the temporary assignments from all of the panels.

If position identifier 432 identifies that the panel being dragged is over, but offset from, an occupied position, position identifier 432 signals new position manager 434 with the occupied position it identifies as described above.

When so signaled, new position manager 434 assigns to the data structure for the panel occupying the position it receives in user interface storage 414 a temporary position that is one higher than the position it receives, and for each position following that position, repeats the process until it reaches a position to which no panel has been assigned or runs out of panels. New position manager 434 then signals panel animator 440 with a list of the panels to which it has assigned temporary positions, and an indication to animate the panels from their regularly assigned positions to their temporary positions.

Panel animator 440 receives the list and for each such panel on the list, causes the animation of the panels on the list from their regularly assigned positions to their respective temporary positions, making the panels appear to animate either simultaneously or sequentially if there is more than one panel on the list. To make the animation appear, for each panel on the list, panel animator 440 causes the operating system or rendering entity to sequentially display the graphical information that comprises the image for the panel, including its contents, along a trajectory from the origin of the panel to its destination, which, in this case, is from the panel's regularly assigned position to its temporary position.

If position identifier 432 does not determine that the panel is to the left of another panel position as described above, if the panel was just initially dragged out of its regularly assigned position as described above, position identifier 432 signals position manager 436 with the identifier of the panel position assigned to the panel being dragged and an indication that the other panels should collapse into that position. When so signaled, position manager 436 subtracts one from the regularly assigned panel positions of each of the panel positions assigned to each of the panels having regular positions higher than the position it receives, and stores each result in user interface storage 414 as new regularly assigned positions for each of those panels. Position manager 436 then signals panel animator 440 with a list of such panels and an indication to animate each panel on the list from its regularly assigned position to its temporary position and panel animator 440 complies as described above and signals position manager. Position manager 436 then removes in user interface storage 414 the temporary assignments from any panels that have them.

In one embodiment, position manager 436 determines whether the panel being dragged is over the selector user interface, having coordinates stored in user interface storage 414 by selector display manager 410. If the panel is over the selector user interface (or, in another embodiment, is over the location approximately where the icon for the dragged panel would appear), position manager 436 provides the title from the panel being dragged to selector display manager 410, which highlights the title on the selector user interface as described above.

If the user releases the mouse button, user action identifier 422 receives an indication that the mouse button has been released as well as the coordinates of the mouse cursor at the point the mouse button was released. In response, user action identifier 422 provides the location of the mouse cursor to release position identifier 450.

When it receives the location of the mouse cursor, release position identifier 450 identifies whether the panel corresponding to the mouse cursor is over a position (which will be blank, or unoccupied because of the actions described above), the selector user interface control or neither of these, in the same manner that position identifier 432 uses.

If the panel being dragged is over or to the left of an unoccupied panel position, release position identifier 450 signals blank position manager 452 with an identifier of the panel being dragged and the position the panel is considered to be over. When so signaled, blank position manager 452 assigns in user interface storage 414 the temporary positions as new regular positions to any panel to which a temporary position had been assigned, and then removes the temporary assignments from such panels. Blank position manager 450 assigns in user interface storage 414 the panel position received corresponding to the identifier received to the panel being dragged. Blank position manager 452 then signals panel animator 440 with the identifier of the panel and an indication to animate the panel from its current location stored in user interface storage 414 to the position to which it has been assigned, and panel animator 440 complies, animating the panel into position, and signals blank position manager 452. Blank position manager 452 then signals panel display manager 412 with the identifier of the panel.

Panel display manager 412 then updates the display of the panel corresponding to the identifier it receives. If the panel is an existing panel, the information in the panel is updated during this update. If the panel is a blank panel, panel display manager 412 builds the panel data structure and graphical information, and causes its contents to be rendered as part of the update. Panel display manager 412 then deletes the identifier of the panel selected in user interface storage 414 and sets the opacity of the panel that had been dragged to cause it to be displayed opaquely, and resets the indicator that would otherwise cause the panel to be displayed on top. Panel display manager 412 then signals the operating system or rendering entity to update the display of the panel at the position to which it was assigned and the operating system or rendering entity complies.

If the user releases the mouse button while over the selector user interface control, or over an area of the user interface control that corresponds to the area in which the icon would be displayed for the title of the panel being dragged, release position identifier 450 provides the identifier of the panel to selector display manager 410.

When it receives the identifier of the panel, selector display manager 410 stores an indication in the selector data structure in user interface storage 414 indicating that the panel corresponding to the title of the panel having the identifier it receives is not being displayed, adds the icon for that title to the graphical information used to display the selector user interface, and signals the operating system or rendering entity to update the display of the icon or selector user interface, which it does.

Selector display manager 410 destroys in user interface storage 414 the data structure and image for the panel corresponding to the identifier it receives and indicates the area corresponding to the panel having the identifier it receives to the operating system or rendering entity, which rerenders the screen at that area to omit the panel destroyed. Selector display manager 410 removes from user interface storage 414 the indication of the panel as the currently selected panel.

In one embodiment, before it destroys the data structure and image data, selector display manager 410 signals panel animator 440 with the identifier of the blank panel and the coordinates of the four corners of the icon, and an indication to animate the blank panel in size and location to those of the icon, and panel animator 440 complies by providing the animation and then signals selector display manager 410.

If the user releases the mouse button while not over the selector user interface control, or not over an area of the user interface control that corresponds to the area in which the icon would be displayed for the title of the panel being dragged, and not over, or to the left of, a panel position, release position identifier 450 provides the identifier of the panel to nothing position manager 454.

When it receives the identifier of the panel, nothing position manager 454 identifies whether the panel corresponding to the identifier it receives is marked as a blank panel. If so, nothing position manager 454 provides the identifier of the blank panel to selector display manager 410, which processes it as described above in the same manner it would use to process it if the user had released the mouse button while the blank panel was over the selector user interface control.

If the panel is not a blank panel, but the user releases the mouse button while not over or to the left of a panel position, if the panel is assigned to a regular position assigned to another panel, nothing position manager 454 assigns the other panel and all panels assigned to subsequent positions, to the next higher position. Nothing position manager 454 adds to a list the identifiers of any other panels so assigned a new regular position and provides the list and the identifier of the panel being released to panel animator 440 with an indication that the panel being released is to be animated from its location to its regular position and the other panels are to be animated from the position that is one less than their regularly assigned positions to their regularly assigned positions, and panel animator 440 complies and signals nothing position manager 454.

Panel animator 440 may also signal panel display manager 412 when it completes the animation, and panel display manager 412 initiates updating the display of the contents of each of the panels. Nothing position manager 454 deletes the data structure and image for the blank panel or sets the graphical information for panel identified in user interface storage 414 as the selected panel as opaque and not to be displayed on top, and deletes in user interface storage 414 the designation of the panel as the currently selected panel.

It will be appreciated that the system component described above can operate locally or via a communication interface 460 that provides a link 462 to other computers and networks.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A method of displaying a first set of information at a location on a display screen, comprising:
    determining whether the location corresponds to a first position at which a second set of information is displayed;
    responsive to the location corresponding to the first position at which the second set of information is displayed, providing a preview of a repositioning of the second set of information by animating a potentially reversible movement of the second set of information from the first position to a second position along a trajectory between the first and second positions, wherein the animating is performed before completion of a selection; and
    displaying the first set of information at the location;
    wherein the second set of information comprises rendered content, the content comprising text data; and wherein:
    the first set of information is dragged to the location using a pointing device; and
    wherein the completion of the selection is performed by releasing the first set of information from the pointing device.

2. The method of claim 1, wherein the first set of information comprises a placeholder.

3. The method of claim 2, wherein the placeholder is displayed in response to a drag of an icon from another location.

4. The method of claim 1, additionally comprising animating a movement, from the second position to a third position, of a third set of information that had been displayed at the second position prior to the determining.

5. The method of claim 1, wherein the first set of information had been displayed at a position other than the first position prior to the determining.

6. The method of claim 1, wherein the determining follows a selection of an icon displayed in a set of at least one icon corresponding to identifiers of information sets not displayed.

7. The method of claim 1, wherein the first set of information is displayed:
    semi-transparently; and
    in a manner that causes it to appear over at least one object on the display screen.

8. A system for displaying a first set of information at a location on a display screen, comprising:
    a position identifier having an input for receiving a location of the first set of information, and positions of at least two other sets of information comprising a second set of information, the position identifier for determining whether the location corresponds to a first position at which the second set of information is displayed and signaling at an output responsive to the location corresponding to the first position;
    an animation manager having a first input coupled to the position identifier for receiving the signal, and a second input for receiving an identifier of the first position, the animation manager for, responsive to the signal indicating the location corresponds to the first position at which the second set of information is displayed, causing, via an output, display of a preview of a repositioning of the second set of information by an animation of a potentially reversible movement of the second set of information from the first position to a second position along a trajectory between the first and second positions, wherein the animation is performed before completion of a selection; and
    a display manager having an input for receiving the location, the display manager for causing, via an output, display of the first set of information at the location;
    wherein the second set of information comprises rendered content, the content comprising text data; and wherein:
    the first set of information is dragged to the location using a pointing device; and
    the completion of the selection being performed by releasing the first set of information from the pointing device.

9. A computer program product comprising a storage device having computer readable program code embodied therein for displaying a first set of information at a location on a display screen, the computer program product comprising computer readable program code devices configured to cause a computer system to:
    determine whether the location corresponds to a first position at which a second set of information is displayed;
    responsive to the location corresponding to the position at which the second set of information is displayed, provide a preview of a repositioning of the second set of information by animating a potentially reversible movement of the second set of information from the first position to a second position along a trajectory between the first and second positions; and
    display the first set of information at the location;

wherein the second set of information comprises rendered content, the content comprising text data; and wherein:
the first set of information is dragged to the location using a pointing device; and
the computer readable program code devices configured to cause the computer system to animate the movement before completion of a selection of the location by releasing the first set of information from the pointing device.

10. The computer program product of claim 9, wherein the first set of information comprises a placeholder.

11. The computer program product of claim 10, wherein the placeholder is displayed in response to a drag of an icon from another location.

12. The computer program product of claim 9, additionally comprising computer readable program code devices configured to cause the computer system to animate a movement, from the second position to a third position, of a third set of information that had been displayed at the second position prior to an operation of the computer readable program code devices configured to cause the computer system to determine.

13. The computer program product of claim 9, wherein the first set of information had been displayed at a position other than the first position prior to an operation of the computer readable program code devices configured to cause the computer system to determine.

14. The computer program product of claim 9, wherein an operation of the computer readable program code devices configured to cause the computer system to determine follows a selection of an icon displayed as a set of at least one icon corresponding to identifiers of information sets not displayed.

15. The computer program product of claim 9, wherein the first set of information is displayed:
semi-transparently; and
in a manner that causes it to appear over at least one object on the display screen.

* * * * *